United States Patent [19]

Spica

[11] Patent Number: 5,131,709
[45] Date of Patent: Jul. 21, 1992

[54] CARGO BED LINER SYSTEM

[75] Inventor: Joseph P. Spica, Livonia, Mich.

[73] Assignee: The 2500 Corp., Farmington Hills, Mich.

[21] Appl. No.: 728,767

[22] Filed: Jul. 8, 1991

Related U.S. Application Data

[63] Continuation of Ser. No. 365,671, Jun. 13, 1989, abandoned.

[51] Int. Cl.⁵ ............................................. B62D 33/02
[52] U.S. Cl. ................................. 296/39.2; 296/39.1; 105/423; 411/258; 52/582
[58] Field of Search ........................... 296/39.1–39.3, 296/97.23; 105/432; 224/42.42; 411/82, 258, 171; 52/582, 589, 591, 594

[56] References Cited

U.S. PATENT DOCUMENTS

| | | | |
|---|---|---|---|
| 3,802,144 | 4/1974 | Spica | 52/591 |
| 3,868,798 | 3/1975 | Spica | 52/100 |
| 4,245,863 | 1/1981 | Carter | 296/39.2 |
| 4,287,693 | 9/1981 | Collette | 52/177 |
| 4,468,910 | 9/1984 | Morrison | 52/591 |
| 4,509,930 | 4/1985 | Schweigert et al. | 52/594 X |
| 4,592,583 | 6/1986 | Dresen et al. | 224/42.42 X |
| 4,868,968 | 9/1989 | Dixon et al. | 29/460 |
| 4,936,625 | 6/1990 | Pickard et al. | 296/39.2 |

OTHER PUBLICATIONS

Aia File No. 28-E, Parco Mat File, Oct. 1962.
Brochure entitled "Introducing Dri-Dek" obtained by Applicant during 1986.
Deflecta-Shield Corporation Catalog. dated Jan. 1988, See p. 7 on "Tuff Turf".

Primary Examiner—Dennis H. Pedder
Attorney, Agent, or Firm—Dykema Gossett

[57] ABSTRACT

There is disclosed an improved cargo bed liner system utilizing a plurality of grid-like modules connected to a cargo bed and which are interconnected with a variety of hinge means to provide a structure for lining horizontal, inclined, and vertical surfaces.

20 Claims, 8 Drawing Sheets

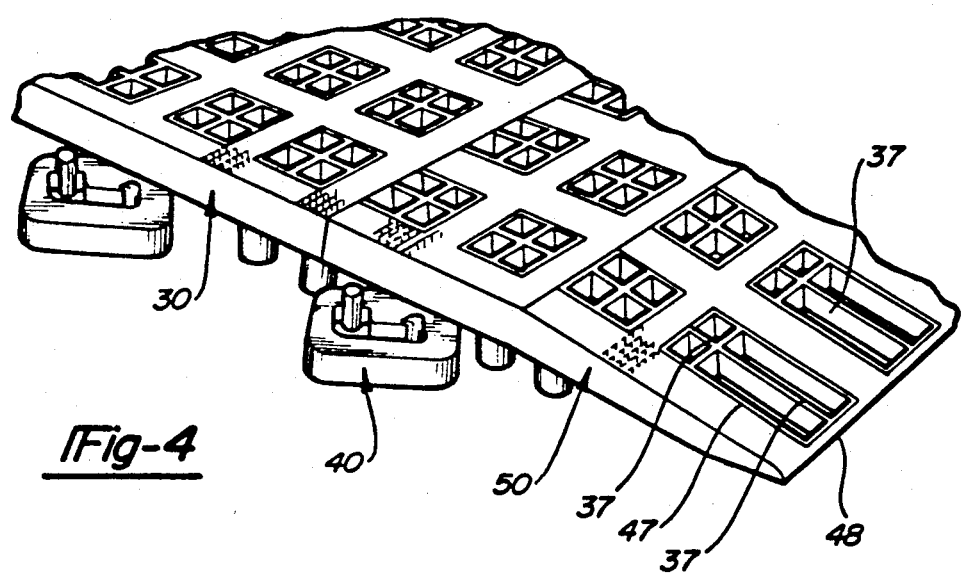
_Fig-4_
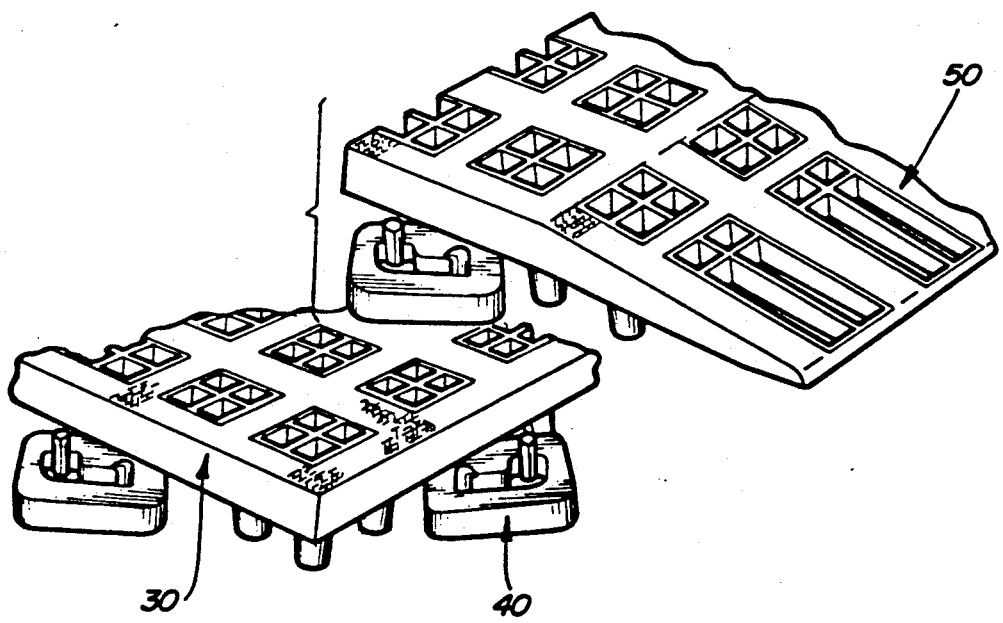
_Fig-5_

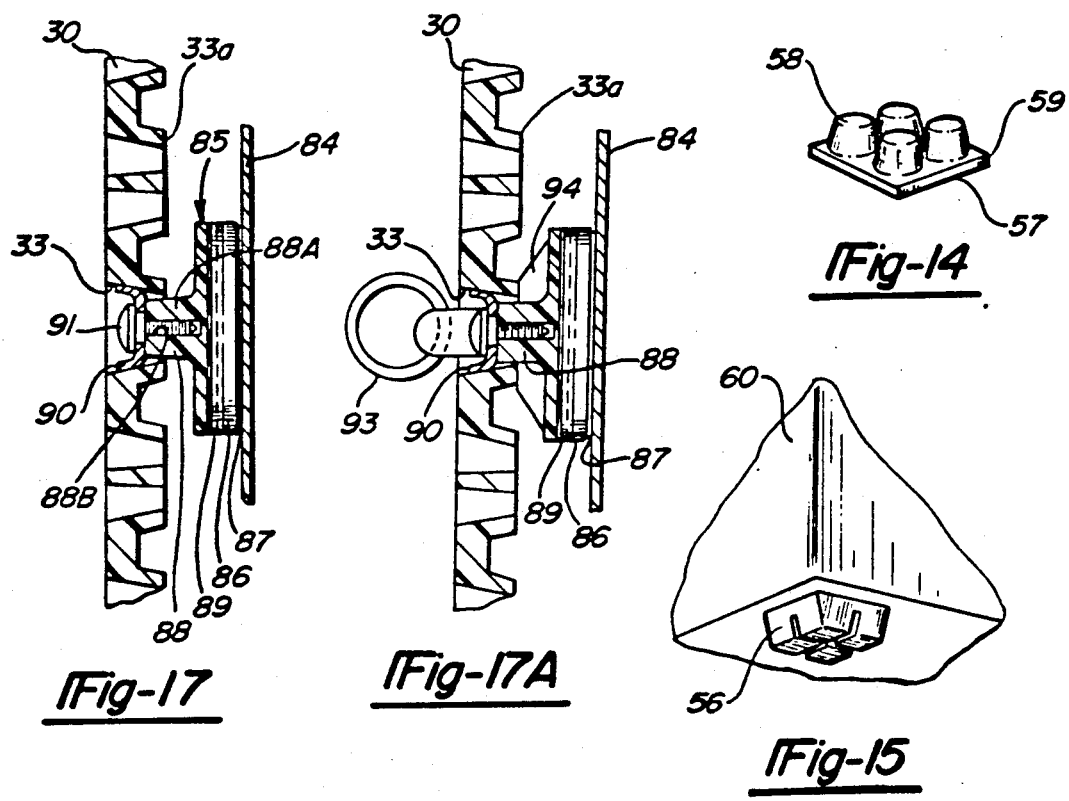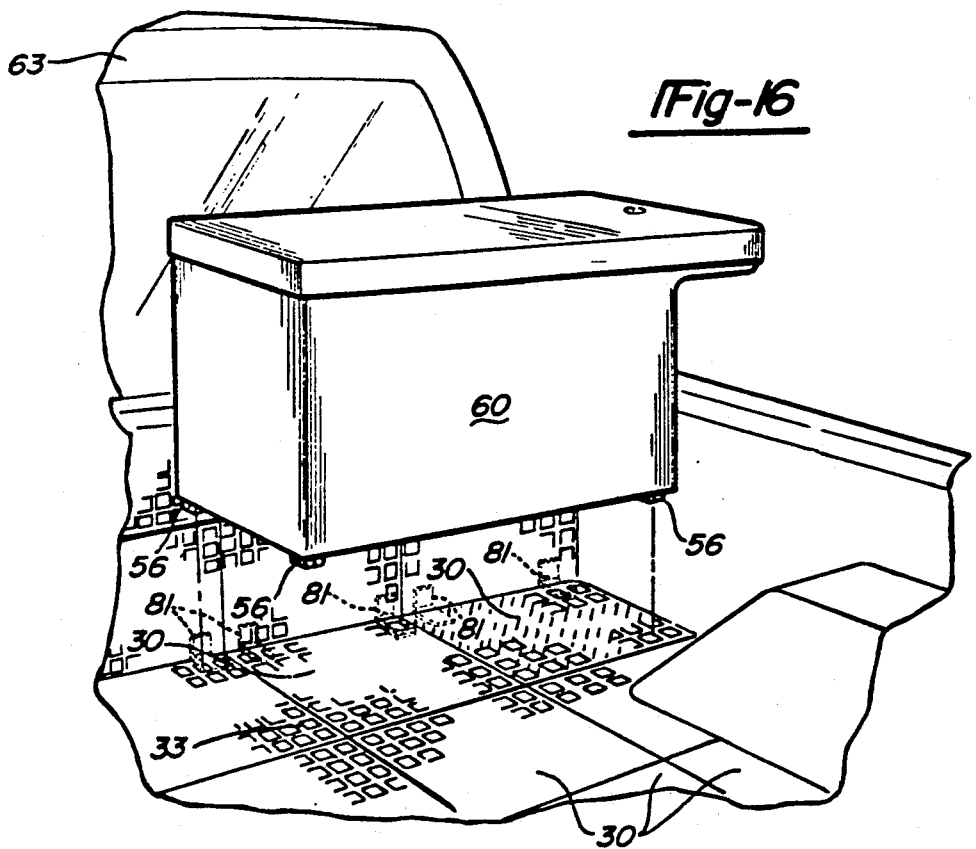

CARGO BED LINER SYSTEM

This is a continuation of copending application Ser. No. 07/365,671 filed on Jun. 13, 1989, now abandoned.

BACKGROUND OF THE INVENTION

1. Field of the Invention

The present invention relates to a system for lining surfaces using a plurality of interlocking grid-like modules for interlocking with adjacent similar or dissimilar modules. The system may be used for lining all types of surfaces, including those where one surface, such as a wall or an incline, joins another surface. In one particularily advantageous embodiment of my invention, my system can be used to line the cargo bed of a pickup truck.

2. Description of Prior Art

The present invention utilizes grid-like modules similar to those disclosed in U.S. Pat. Nos. 3,802,104 and 3,868,798, of which I am the inventor. The specifications of said U.S. Pat. Nos. 3,802,104 and 3,868,798 are specifically incorporated herein by reference. However. such modules, and the interlocking system used with such modules, were only capable of lining substantially flat surfaces. There was no way of providing a continous lining over a discontinuous surface, or where a flat surface, for example, adjoined an inclined or right-angled surface. While the modules could lay on an inclined surface adjacent a flat surface if the incline was not too steep, as a practical matter, if the surfaces received any use, the two lined surfaces, that is, the flat surface and the inclined surface, could separate from each other, presenting a hazardous condition.

Further, it was simply impossible to line a wall area adjacent to a floor, for example, where such lining would be desirable to prevent damage to a wall, since until the present invention, my modules could not easily be attached to a wall.

Further, when it became apparent to me that my modules would be very advantageous for lining cargo beds of various vehicles such as vans, trucks, and the like, there was no way of attaching such modules to these surfaces without causing permanent damage to the vehicle or craft in which it was mounted. After much experimentation, it was determined that by providing additional hinge members of various types, and by providing a connector which did not have to penetrate the surface to which it was attaching a module, my modules could be formed into a system which could line inclined and right-angled surfaces, as well as being used in a portable fashion, such as by lining the cargo areas of vans, pickup trucks, and the like.

SUMMARY OF THE PRESENT INVENTION

To provide my improved cargo bed liner system, I provide improvements to the modules disclosed in the aforementioned U.S. Patents, together with providing additional, novel, hinge means for joining said modules, and by providing a novel connector for attaching said modules to a surface, but which does not penetrate the surface in any fashion.

Thus, it is an object of the present invention to provide a system for lining one or more surfaces with a through and underdraining surface.

It is a further object of the present invention to provide a system for lining surfaces, some of which may be discontinuous, but all of which lie in one or more substantially flat planes, angularly related to each other, with a through and underdraining surface, wherein the sections of the lining forming the various planer portions are formed of interlocking modules joined together, and the various planer surfaces so formed are joined to each other by various hinge means.

It is a further object of the present invention to provide a system of the foregoing nature wherein at least some of the grid-like modules are of a different color than others of said grid-like modules to form a predetermined desired pattern in at least one of said planer surfaces.

It is a further object of the present invention to provide a ramp portion in said through and underdraining surface to provide for ease of entry onto said surface.

A still further object of the present invention is to provide that said foregoing ramp portion be a right hand ramp portion.

A still further object of the present invention is to provide that said foregoing ramp portion be a left hand ramp portion A still further object of the present invention is to provide a border portion in said through and underdraining surface with said border portion being formed of tiles or modules of a different size than the remainder of said grid-like modules A still further object of the present invention is to provide for the top surface of at least some of said grid-like modules to be covered with pyramidal projections to provide traction to the lined surface.

A still further object of the present invention is to provide for the easy attachment of load-stopping means to said through and underdraining surface for use with tool boxes and the like, whereby stop members can be attached to said objects, and by virtue of the fact that said stop member has a lower surface of a shape to fit into apertures in said grid-like modules, provide for preventing of movement of said objects across the top of said through and underdraining surface.

It is a further object of the present invention to provide for structural members having means to engage the apertures in said grid-like modules to provide for the attachment of various wall or bar type surfaces wherever desired in the lined surface.

It is a further object of the present invention to provide a right angle hinge means for joining the grid-like modules lining a horizontal surface with the grid-like modules lining a vertical surface.

It is a further object of the present invention to provide means for anchoring the grid-like modules of the foregoing nature which line a right angle surface, to said surface, without piercing said surface.

A still further object of the present invention is to provide a living hinge type member for joining grid-like modules lining a horizontal surface to others of said grid-like modules lining an inclined surface.

It is a still further object of the present invention to provide means for positively anchoring one or more of said grid-like modules to a surface being lined when desired.

It is a still further object of the present invention to provide anchoring means for positively anchoring said grid-like modules to a surface being lined wherein said anchoring means does not penetrate the surface being lined.

It is a still further object of the present invention to provide a system of the foregoing nature which is useful in lining cargo areas in pickup trucks, vans, and the like.

Further objects and advantages of the present invention will be apparent from the following description and appended claims, reference being made to the accompanying drawings forming a part of the specification, wherein like reference characters designate corresponding parts in the several views.

BRIEF DESCRIPTION OF THE DRAWINGS

FIG. 4 is a partial perspective view showing a right hand ramp module attached along one edge of a grid-like module.

FIG. 5 is an exploded view of FIG. 4 showing how the ramp module will be attached to the grid-like module.

FIG. 14 is a perspective view showing a modification of the stop member shown in FIG. 9.

FIG. 15 is a partial perspective view showing one of the stop members of the present invention mounted to a corner of the tool chest shown in FIG. 16.

FIG. 16 is a partial perspective view showing a pickup bed lined with the lining system of the present invention, and showing a tool chest having a plurality of stop members mounted on the bottom thereof, which are insertable into the apertures of the grid-like modules used in my bed lining system, to firmly mount a tool chest against lateral movement while the pickup truck is in motion.

FIG. 17 is a partial sectional view showing an anchoring means as used in the present invention for anchoring grid-like modules to inclined or right angled surfaces which does not penetrate the surface to which the module is attached.

FIG. 17a is a partial sectional view similar in large part to FIG. 17 but showing a modification of the present invention wherein a thumbscrew is used in place of a conventional screw.

It is to be understood that the present invention is not limited in its application to the details of construction and arrangement of parts illustrated in the accompanying drawings, since the invention is capable of other embodiments, and of being practiced or carried out in various ways within the scope of the claims.

DESCRIPTION OF THE PREFERRED EMBODIMENTS

Figure 1:
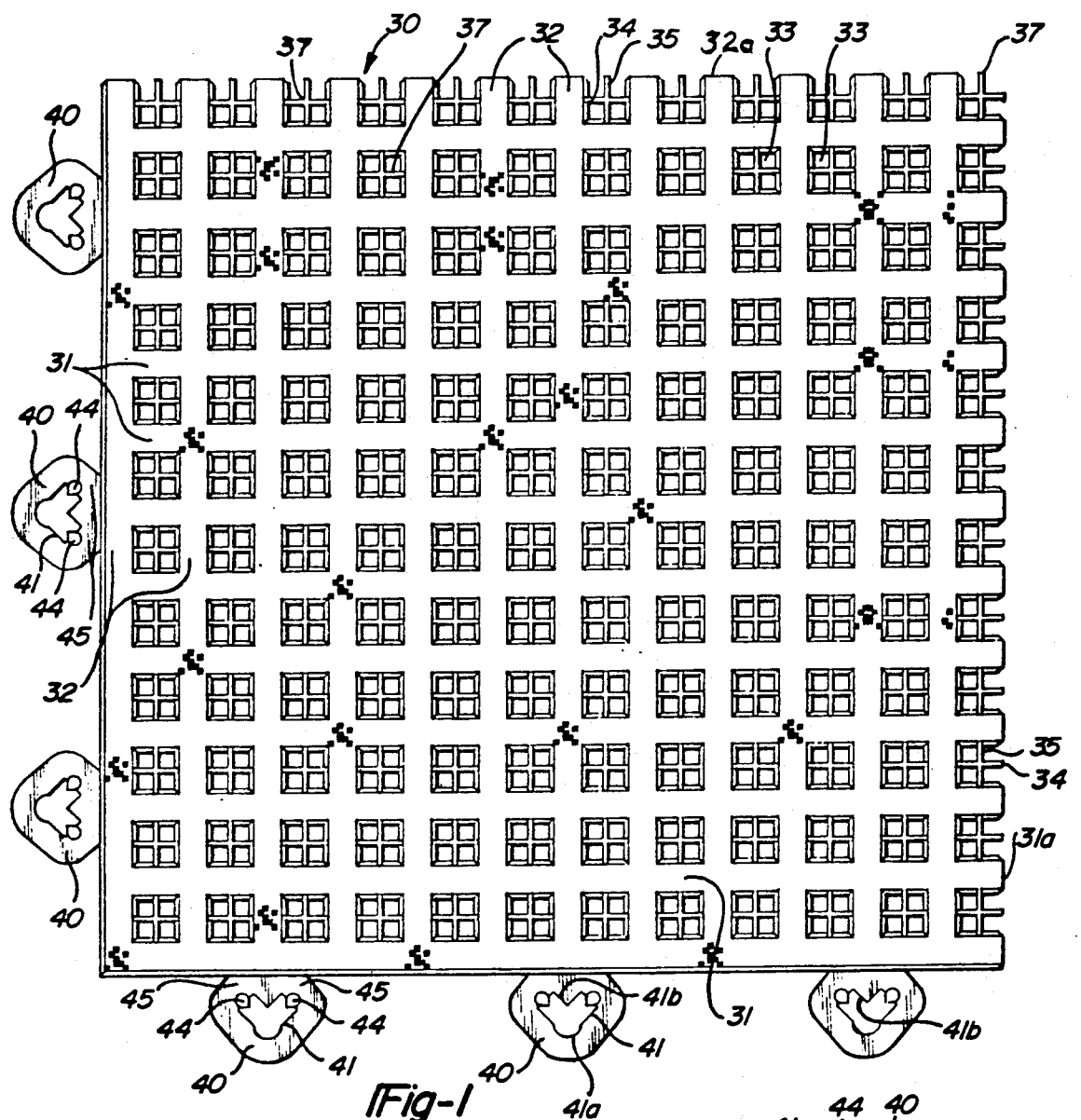
FIG. 1 is a plan view of one of the grid-like modules used in the surface lining system of the present invention.

Referring now to FIG. 1, there is shown one of the grid-like modules used in the surface lining system of numeral 30. The grid-like module 30, from above, presents the appearance of a grid or grating of perpendicularly intersecting sets of equi-spaced, like, thick grid bars, such as the horizontal grid bars 31 and the vertical grid bars 32, defining therebetween square apertures 33. The cross section of both the vertical grid bars and the horizontal grid bars is trapizoidal, with parallel top and bottom surfaces, and upwardly converging, tapering, like sides, so that equally, but oppositely, slopped lateral surfaces define the square apertures 33. This provides for drainage and cleanliness of the grid-like modules. In addition, the top surface is provided, if desired, with the pyramidal projections 38 to provide a non-skid surface. All or a portion of the top surface of the module may be covered with such projections.

While the square apertures 33 should be fairly large for drainage, it is contemplated that in that some cases where the modules are used in an office environment, there may be provided a hazard for women's high-heeled shoes, and in these localities, the aperture filling horizontal and vertical grid bard 34 and 35 are used to fill in the square apertures 33 with the crossbars or window panes 37, so thin heels will not get caught in the apertures.

Figure 2:
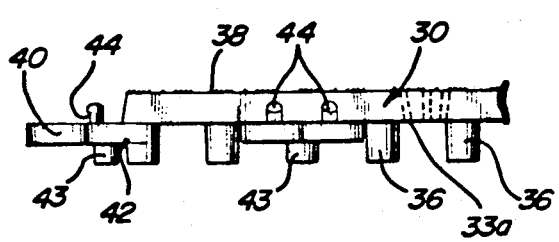
FIG. 2 is a partial elevational view of the module shown in FIG. 1.
Figure 3:
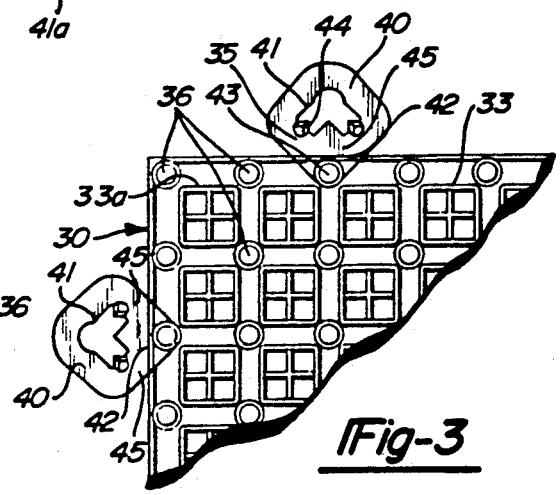
FIG. 3 is a partial bottom view of the grid-like module shown in FIGS. 1 and 2.

As can be seen by referring to FIGS. 1-3, two adjacent sides or "bar sides" of the module 30 are defined by a horizontal grid bar 31, and a vertical grid bar 32, respectively, from each of which project interlocking lugs 40, having short support feet 43 at a location downwardly off set so that their surfaces occur at the level of, or slightly below, the plane of the bottom surface of the grid bars, to permit overlapping by an adjacent module for interlocking. As seen in FIG. 1, the lugs 40 occur in alignment with the horizontal grid bars 31 and the vertical grid bars 32. A preferred spacing of the interlocking lugs 40 is shown with five (5) bars between each lug. However, other spacings may be used depending on the application to which my surface lining system is to be put.

Located at each intersection of a horizontal grid bar with a vertical grid bar are a plurality of equal length support feet 36. While in the preferred embodiment, for heavy duty application, it is preferred that there be a support foot 36 at every intersection of a horizontal grid bar with a vertical grid bar, in some applications it is anticipated that the surface liner may be put to a lighter duty use, and some of the support feet 36 may be omitted, if desired.

Also, all of the feet have been shown to be of equal length in the preferred embodiment. It is anticipated that my surface liner system may be used in some applications where the surfaces are discontinuous, and in such cases some of the support feet 36 may be of greater length than others. It is also anticipated that in some instances my liner may be used on curved surfaces, in which case the length of the support feet in various locations may vary as necessary to maintain the grid-like module 20 in a stable condition on a curved surface.

A shallow groove 42 may be provided along the projecting interlocking lugs 40 so that they may easily be broken off, or provide a guide for sawing off, if desired.

Each interlocking lug (40) structure is symmetrical about the longitudinal center line of the respective grid bar, and in plan view extends into a barb shaped enlargement. An irregularly shaped aperture 41 has a rounded portion 41a and a pair of slot-like projections 41b, into which the support feet 36 fit when the modules are interlocked. The irregularly shaped aperture 41 may be considered to be, in effect, a basic foot receiving round hole intersected by broad radial slots at a right angle to each other, resulting in the rounded portion 41a being a half round portion toward the lug tip, and two (2) broad, generally rectangular, radial parts forming the slot-like portions 41b, in effect, intersecting each other at right angles with center lines at 45 degress to the lug center line, and also intersecting the axis of the basic hole or center of the half round.

A short support foot 43, with a bottom terminating co-planerly with the support feet 36 in the preferred embodiment, is located beneath the angular region between slots 41b for operative support of the lug as hereinafter described. Further, two upward posts 44 are provided on the lug regions forming the narrow end walls 45 for the slots 41b. Though the rectangular opening represented by such radial slots 41b each accommodate, for production tooling purposes, a mold portion cooperating in defining the cavity region producing respective posts 44, resultant product lug structure in this area is advantageous, as later noted.

Each post 44 has a semicylindrical portion extending above and away from the slot, and which, toward the slot, merges into a vertical rib, e.g., triangular in cross section, carried down onto the slot end wall, the top or head part of the post 44 being rounded, yet presenting a tear-drop shape in plan view, with the "tailing" of the drop projecting toward, and on the center line of the slots, and presenting an included right angle. The tailing enlargement of each head is comprised of two (2) intersecting semicylindrical portions having intersecting horizontal axis, disposed respectively parallel and perpendicular to the lug center line, and therefore, to the respective bar center line.

As in the aforementioned U.S. Patents, the shaping and spacing of the post 44 with respect to each other across, i.e., on opposite sides of the lug, and with respect to the rounded portion 41a of the irregularly shaped aperture 41, are such that when another module is interlocked with a foot 34 received in aperture 41 first the associated grid bar end extension of the entering foot elastically displaces from each other, and then seats between the posts. At the same time, the posts are being displaced in a common direction by the bar of the descending module carrying the entering foot. Thus, each post is simultaneously subjected to two forces at right angles to each other, one tending to displace it away from the lug center line, the other to move it parallel to the center line, with the resultant force or motion, for the given geometry, at 45 degrees to the lug center line, and radially away from the axis of the irregularly shaped aperture 41.

Along the remaining two sides of the module without the interlocking lugs 40, in effect, the intersecting horizontal grid bars 31, or vertical grid bars 32, are carried out from the outer most bar 31 (or 32) in equal length projections 31a or 32a by an amount corresponding to the normal spacing between the sides of the adjacent bars, the end of each such projection being downwardly, inwardly, slopped corresponding to the bar side slopes, so that when one module is brought with its projecting bar side against the lugged straight side of an adjacent module, alternating feet can be received down in, and interlock with, respective lugs, with the bar projections of the one module aligned with the correspondingly oriented bars of the adjacent module, and also extending close to the edge bar of the adjacent module as seen hereinafter. Although this is the preferred embodiment, as will be described hereinafter, in some applications it is preferred that all four (4) edges of the grid-like module 30 be defined by either a horizontal grid bar 31, or a vertical grid bar 32.

Referring now to FIGS. 4 and 5, an improved ramp portion 50 for use in my surface lining system can be observed. The right hand ramp module 50 has a plurality of square apertures 33 and rectangular apertures 47, with the rectangular aperture forming the last row before the edge 48 of the right hand ramp 50. It is particularly important that the rectangular apertures 47 have the window panes 37 therein because of problems encountered in the use of the modules described in the aforementioned letters patent. When the ramps were used in office areas, women's high heels would get caught in between the grid bars, and when used in an industrial areas, wheels found on such things as industrial carts would jam in between the grid bars. I found it was necessary not only to put in the window panes 37, but to have a closed edge 48.

Figure 6:
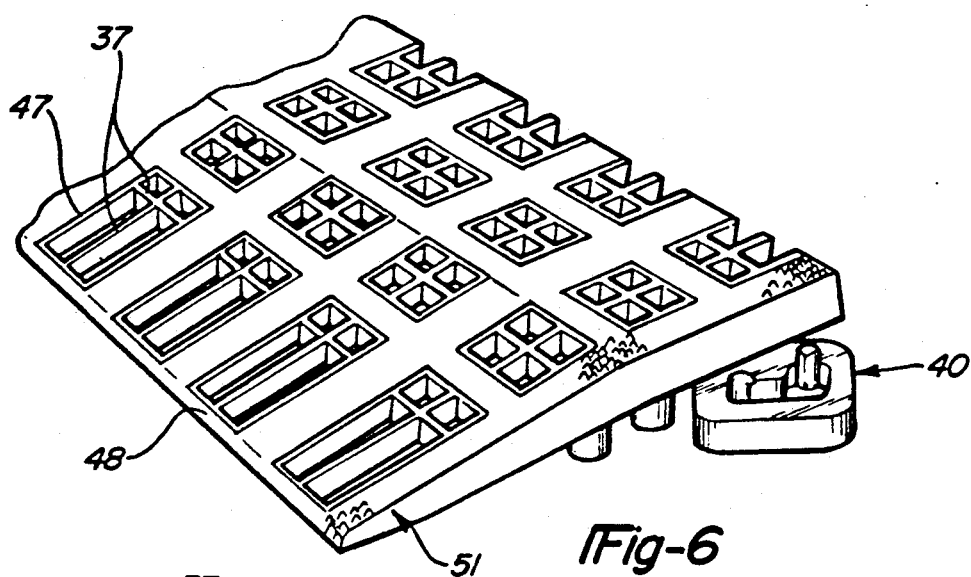
FIG. 6 is an enlarged perspective view similar to FIGS. 4 and 5, but showing a left hand ramp module.

It can be seen by referring to FIG. 5 that the width of a ramp module is approximately one half the width of a grid-like module 30, and that the two (2) are joined together just like a pair of the grid-like modules would be. Referring to FIG. 6, it can be seen that a left-hand ramp 51 is also available for use in my improved lining system.

Figure 7:
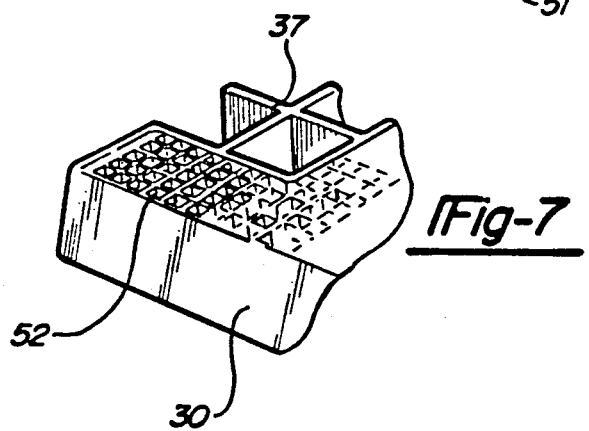
FIG. 7 is an enlarged, partial, perspective view showing the pyramidal surface and cross bars which may be used in modules, if desired.

Although not shown, one other type of module, that being a border module, is used in my system. A border module is simply is of the same construction as the grid-like module 30, but one half the width thereof. It is anticipated that the border modules will be of a different color than the grid-like modules to form a desired color pattern in the surface lined with my system, such as to outline storage areas, safety aisles, etc. As previously mentioned, as can be seen by referring to FIG. 7, it is preferred that the entire top surface of the module 30 be covered with pyramidal projections 52.

Figure 8:
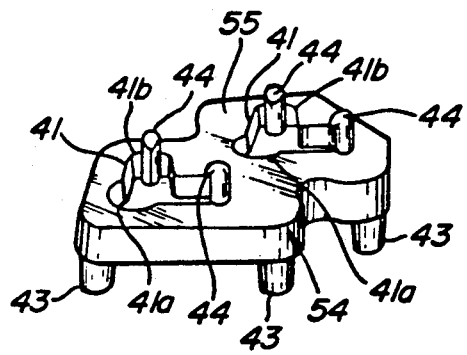
FIG. 8 is a perspective view showing a rigid interlocking connecting means.

In some instances, where the surface to be lined is discontinuous or rough, it is anticipated that the standard number of interlocking lugs 40 on the module 30 may be insufficient to provide a firm connection. For use in these instances, the rigid interlocking connecting means of FIG. 8, generally designated by the numeral 54 is provided. The connecting means has an irregularly shaped body portion 55 in which are provided two irregularly shaped apertures 41 which are the same as found in the interlocking lugs 40. As before, each aperture has a rounded portion 41a and two (2) slot like portions 41b, as well as a plurality of short support feet 43, which in this instance are of a smaller diameter than found on the bottom of the lugs 40. As before, two (2) posts 44 are provided in each aperture, and each post has a tear-drop post head 46 for the purposes described herein before. It can be seen that one of these rigid interlocking connecting means 54 can be inserted between each of the interlocking lugs 40 on the module 30 if desired.

Figure 9:
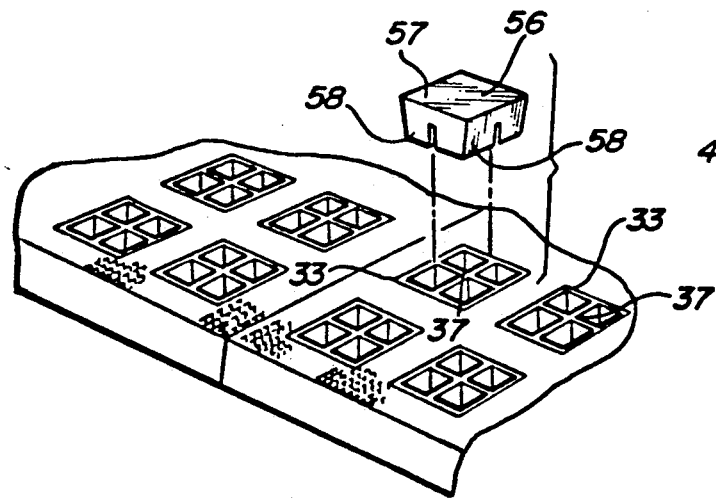
FIG. 9 is a partial, perspective, view showing how a stop member may fit into an aperture of the grid-like module.

A unique feature of my surface lining system is the opportunity provided to prevent lateral movement of various loads over the surfaces thereof by the use of load-stopping means such as the stop number 56 shown in FIG. 9. It can be seen that such a stop member has a flat upper surface 57 which can be attached by any practicable means to the bottom of a wide variety of loads to be restrained, and a plurality of projections 58 of a shape such that the projections 58 will fit in the space defined by an aperture 33 and a window pane 37.

A modified stop member 59 is shown in FIG. 14. Again, it has the flat upper surface 57, this time shown rotated 180 degrees for ease of illustration, and a plurality of projections 58, this time being circular in nature, rather than square.

Referring to FIGS. 15 and 16, there is shown a plurality of the stop members 56 attached to the underside of a tool chest 60. These stop members are placed so as to fit into the appropriate square apertures 33 provided in the modules 30 which, in this case, are being used to line a bed of a pickup truck 63. It should be understood that the joints between the modules 30 are only illustrated to show their positioning, and in actual use, when installed, an unbroken surface will appear.

Figure 10:
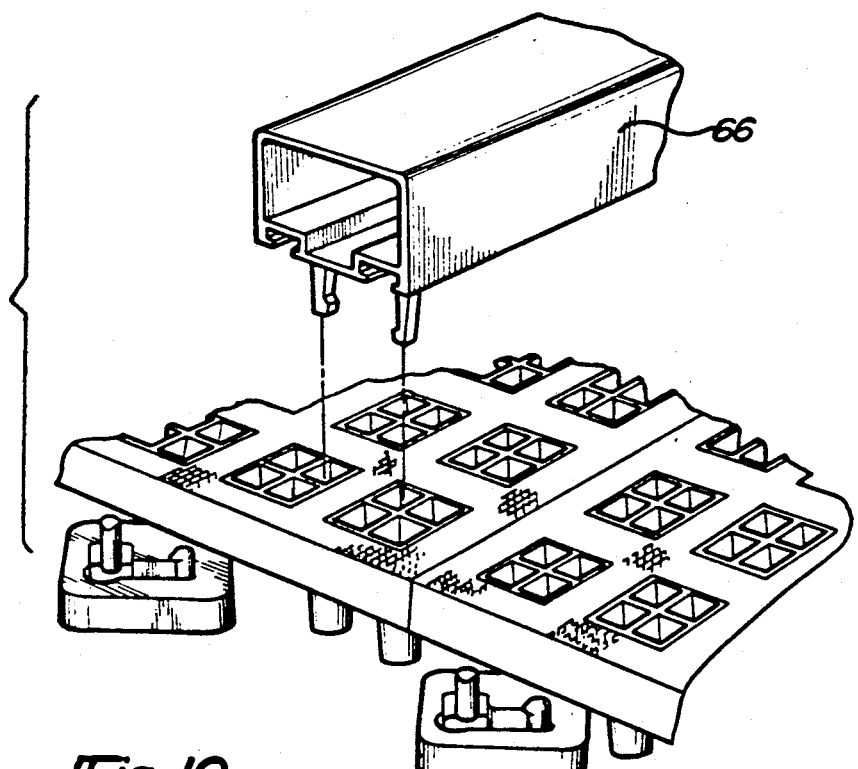
FIG. 10 is a partial perspective view showing how a load stopping means in the form of a structural member may snap into the apertures in the modules.
Figure 11:
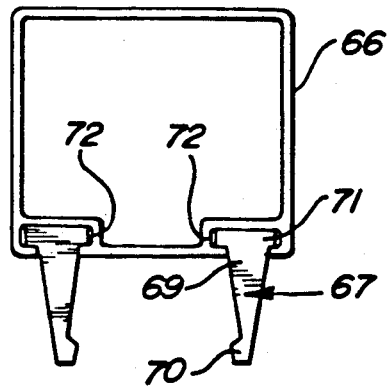
FIG. 11 is an end view of the structural member shown in FIG. 10.
Figure 12:
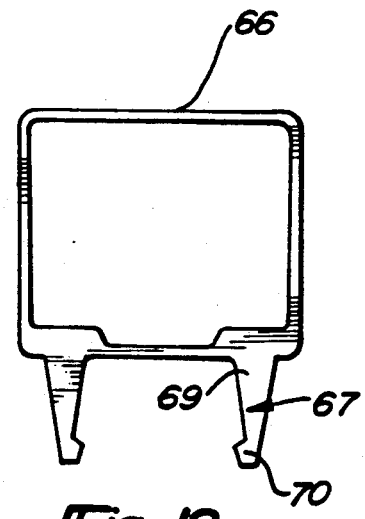
FIG. 12 is an end view of a modification of the structural member shown in FIG. 11, where the attaching means are formed integrally with the remainder of the structural member.

Referring to FIGS. 10-12, another advantage of my lining system can be seen in that it is possible to have the load stopping means also take the form of structural members connected to the modules 30 in the apertures 33. In the embodiments shown in FIGS. 10-12, the load stopping means take the form of the structural member 66 having aperture engaging means, generally designated by the numeral 67, either formed integrally with the structural member 66, as shown in FIG. 12, or formed separately, and having a shank portion 69 and a hook-like end portion 70. When the aperture engaging means 67 is formed as a separate piece, the enlarged head portion 71 thereof will slidably fit in an axially extending groove 72 provided in the bottom of the structural member 66. Normally two (2) of such axially extending grooves 72 are provided in the bottom of each structural member.

With the aperture engaging means 67 slidably positioned in the axially extending groove 72, it can be seen that the structural member 66 can be placed in virtually any position on the lined surface by simply having the aperture engaging means positioned in the grooves 72 in an appropriate position to be inserted in the apertures 33 in the modules 30, and engage the end walls 33a of the respective apertures. The versitility added to my surface lining system by being able to snap into place, at virtually any place in said system, a structural member to restrain lateral movement of loose objects, is virtually limitless. Further, the structural member may be provided in a wide variety of sizes and shapes such as shown in FIGS. 13a, 13b, 13c, and 13d.

Figure 13A:
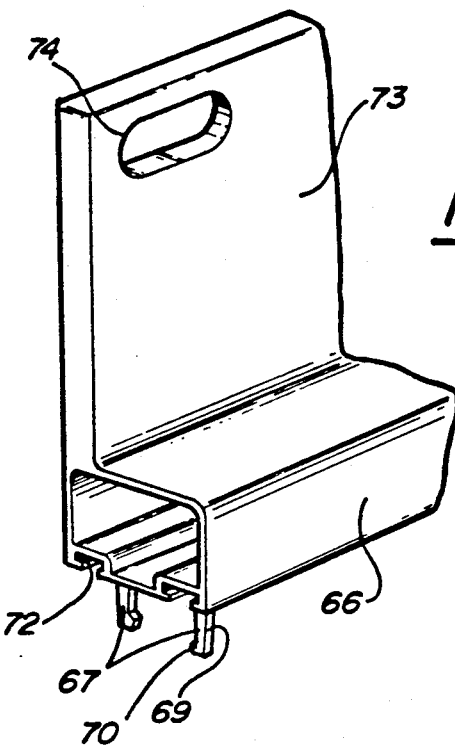
FIG. 13a is a partial perspective view of a structural member having an upstanding wall portion proximate an edge of said structural member.

Referring now to FIG. 13a, the structural member 66 may be provided with an upstanding wall portion 73 proximate one edge of the structural member. In addition to having the normal, axially extending grooves 72 provided in the bottom surface therein, into which are fitted the aperture engaging means 67, a hand hold 74 may be provided therein to provide for ease of insertion of the structural member 66, as well as to serve the normal purposes for which hand holds are provided.

Figure 13B:
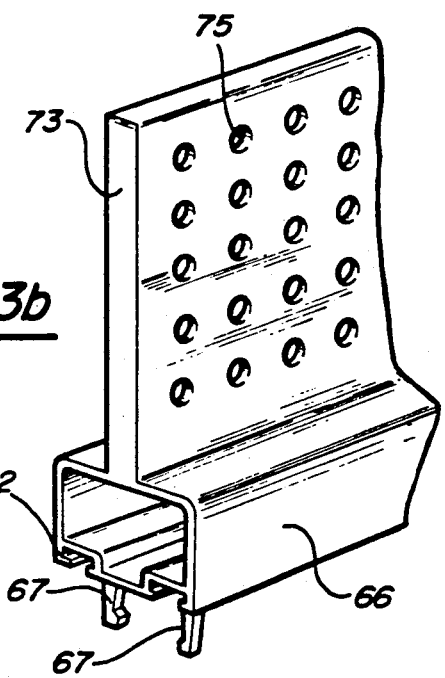
FIG. 13b is a view similar in large part to FIG. 13a, but having the upstanding wall portion proximate the middle of the structural member, and having a plurality of holes in said upstanding wall portion.

As shown in FIG. 13b, the upstanding wall portion 73 may be proximate the middle of structural member 66, and may have a plurality of holes 75 provided therein if desired.

Figure 13C:
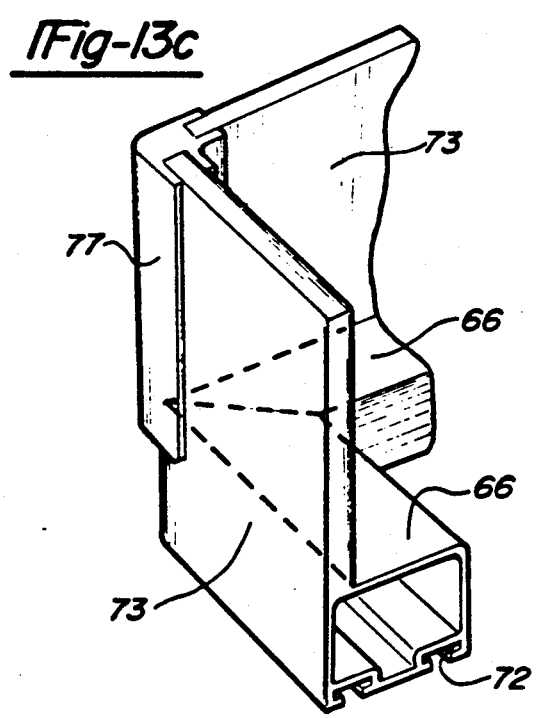
FIG. 13c is a partial perspective view showing two of the structural members shown in FIG. 13a) joined about an abutting edge by means of a corner brace.

As shown in FIG. 13c, a pair of the structural members 66 may be joined together at right angles by means of a corner brace 77, for purposes such as restraining a load on one portion of the lined surface. For purposes of illustration, I have shown two of the members illustrated in FIG. 13a joined at their corners by the brace 77 after the ends thereof have been modified to make this joining possible. However, it should be understood that any of the versions of structural members 66 can be joined in this manner once the necessary modifications to the ends have been made.

Figure 13D:
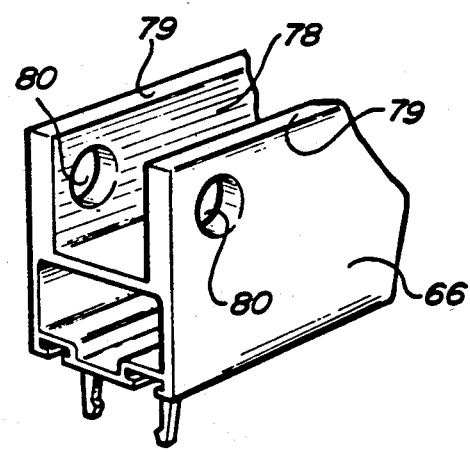
FIG. 13d is a partial perspective view of a further modification of a structural member usable in the system of the present invention.

These structural members may be made in any desired size and shape, such as shown in FIG. 13d, wherein the structural member 66 may have a channel 78 formed therein and defined by two (2) walls 79. A pair of holes 80 may be provided for tie down purposes if desired.

Figure 18:
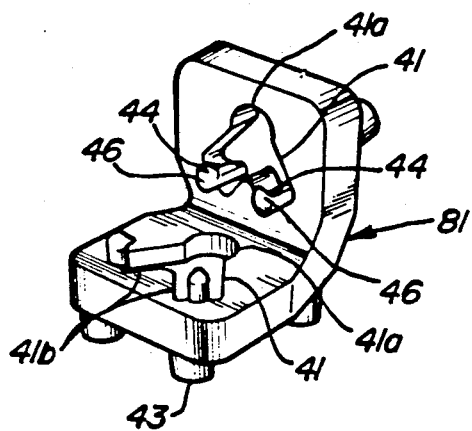
FIG. 18 is a perspective view of a rigid, right angled, interconnecting locking means.
Figure 19:
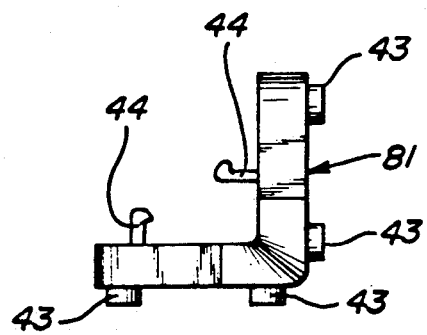
FIG. 19 is an elevational view of the interlocking connecting means shown in FIG. 18.

Referring now to FIGS. 18 and 19, a particularly advantageous feature of the present invention is that it may be used to line surfaces which are at right angles to each other by means of the provision of the right angled interconnecting locking means 81. As with the interlocking lugs 40, and the rigid interlocking lockings means 54, the right angled inconnecting locking means 81 is provided with a pair of irregularly shaped apertures 41, each having a rounded portion 41a, and a pair of slotted portions 11b, all provided at right angles to each other. Also, as before, for each irregularly shaped aperture 41, there are a pair of posts 44 with tear-drop shaped head portions 46. As before, short support feet 43 are provided. As many of these right angled interlocking locking means 81 are used as is necessary to connect the edges of the modules 30 lining the horizontal surface with the adjacent edges of the modules 30 lining the vertical surface.

Figure 20:
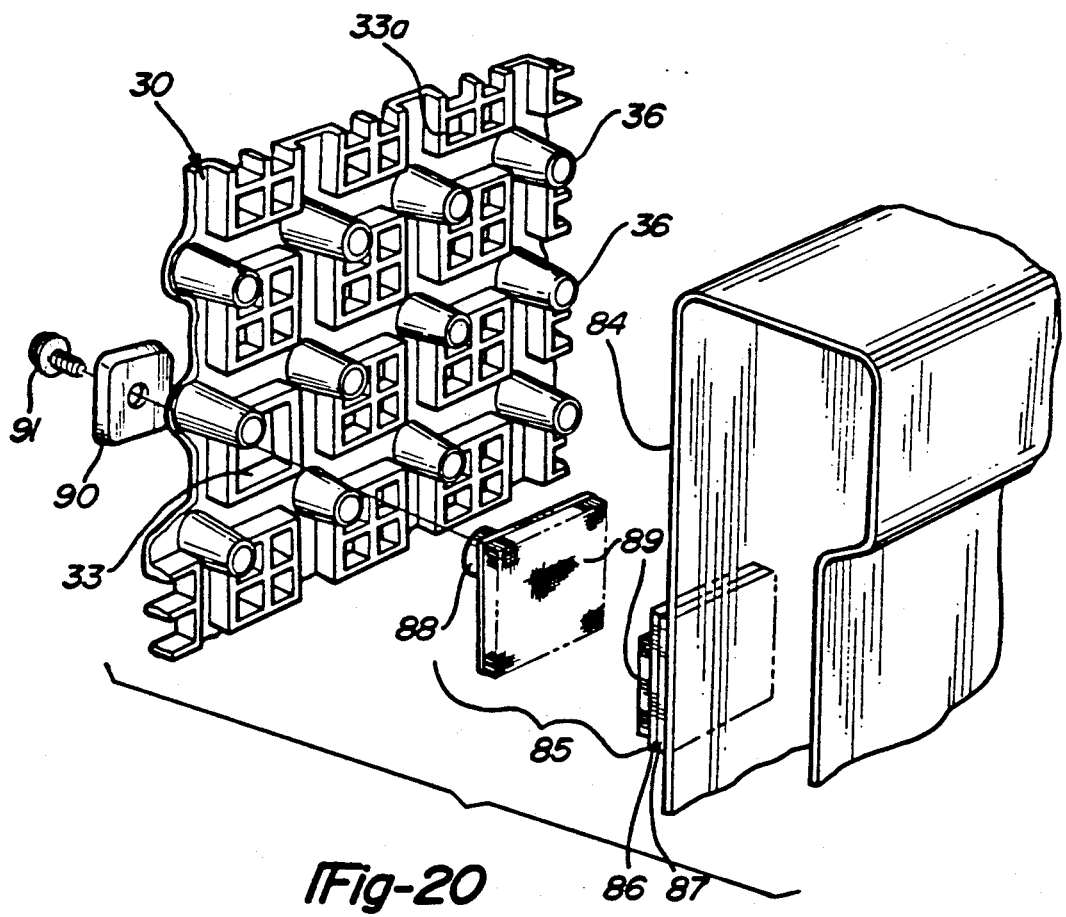
FIG. 20 is an exploded view, showing in greater detail the connector shown in FIG. 17, as it may be used to attach grid-like modules to a tail gate of a pickup truck to form a tail gate liner.

Referring to FIGS. 17, 17a, and 20, in many applications, such as when my surface lining system is used as a tail gate lining, it will be necessary to anchor the modules 30 lining the vertical surface to the vertical surface itself, such as the tail gate 84. In this case, there is provided an anchoring means, generally designed by the numeral 85, and including a base 86 attached by adhesive 87 or other suitable fastening means to the tail gate 84. A connector receiving portion 88 of the anchoring means 85 is removably attachable to the base 86 by a detachable connecting means 89, such as Velcro or the like. The connector receiving portion 88 includes upstanding post portion 88A, having a connector receiver 88B therein, such as a hole or threaded opening. A cup washer 90 is placed into a square aperture 33 from which the window pane 37 has been removed, or omitted, and a connector 91 is passed through the cup washer 90 and connected to the connector receiving portion 88. In the instant illustration, a screw 91 is screwed into the connector receiving portion 88, but it should be understood that other types of connectors can be used, such as the thumbscrew 93 shown in FIG. 17A.

A tail gate liner which can be used in pickup trucks, and other type of trucks, regardless of whether or not the remainder of the cargo area is lined, can simply be made by attaching a predetermined number of anchoring means to the tail gate of the pickup truck, and attaching the appropriate number of the grid-like modules 30.

If desired, for heavy duty use, or when lining a vertical wall, the connectors 91 used with the cup washers 90 can be screwed directly into the wall.

Figure 21:
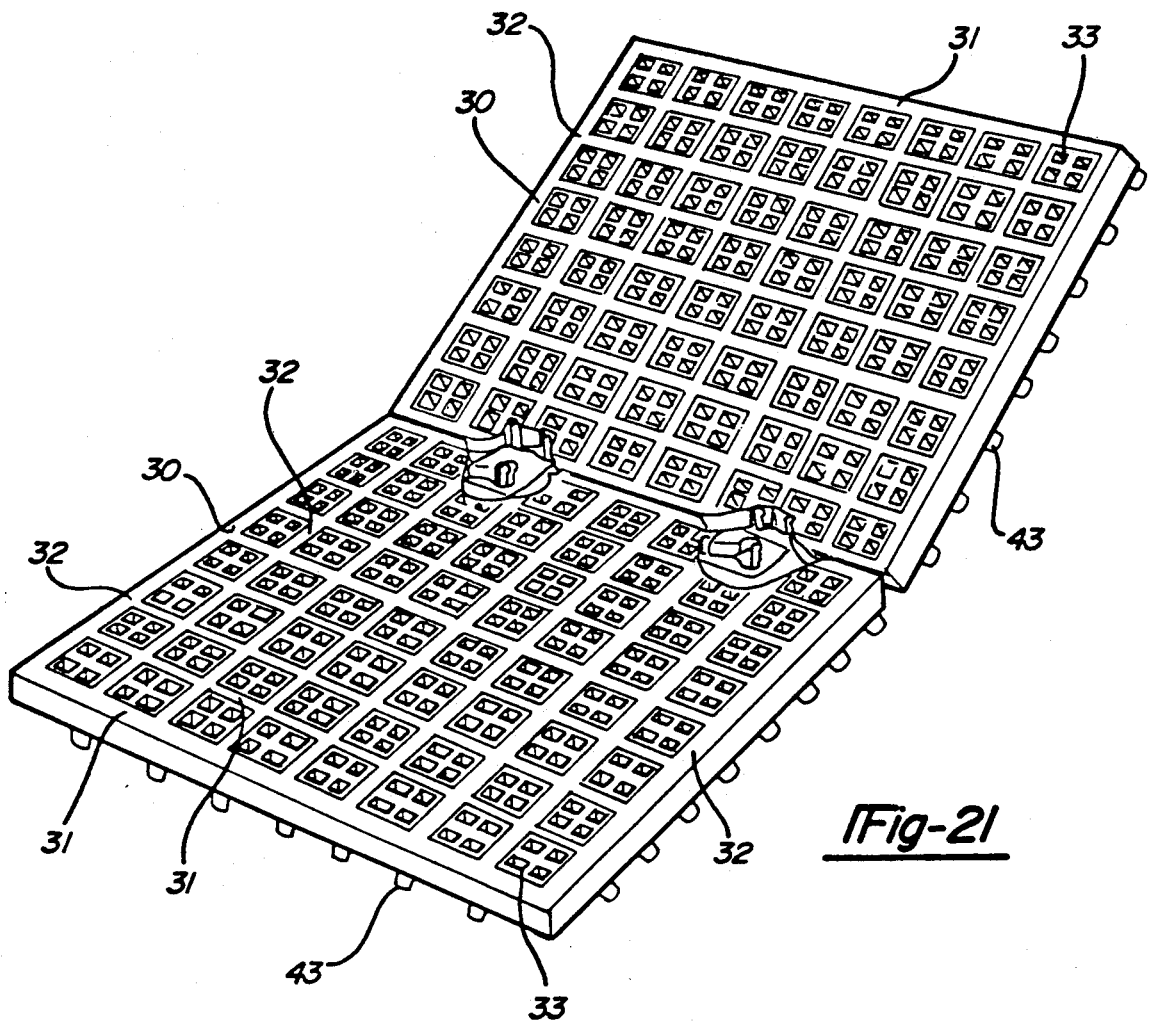
FIG. 21 is a perspective view, partially broken away, showing how the hinged interlocking connecting means shown in FIG. 22 can be used to attach together grid-like modules to provide for transition between a lined, horizontal, surface and a lined, inclined surface.
Figure 22:
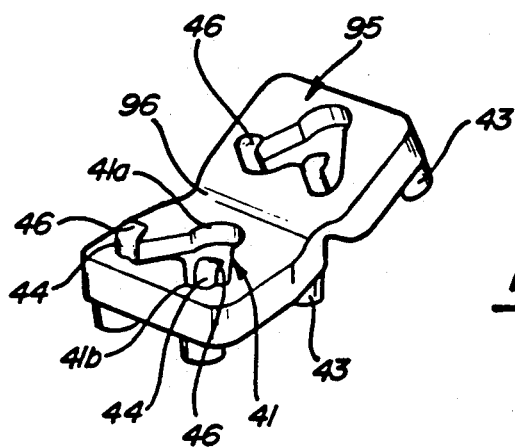
FIG. 22 is a perspective view of a hinged interlocking connecting means.

Referring now to FIGS. 21 and 22, it can be seen that my surface lining system is extremely versatile in that, in addition to being able to line horizontal and vertical surfaces, it can also be used to line inclined surfaces by the provision of the hinged interlocking connecting means 95. In this embodiment of my invention, the hinged interlocking connecting means 95 is divided substantially into two (2) portions by the hinge 96, which may be such as a living hinge, or other hinge means. As with the interlocking lugs 40 or the rigid interlocking connecting means 54, each portion of the hinged interlocking connecting means is provided with an irregularly shaped aperture 41 having a rounded portion 41a, and a pair of slot like portions 41b, with a pair of posts 44 having a tear-drop shaped portion 46.

As can be seen by referring to FIG. 21, when a horizontal lined surface meets an inclined lined surface, there will be abutting edges of modules 30 which must be connected, and this is easily accomplished by the use of a plurality of the hinged interlocking connecting means 95. If the inclined surface is not on a steep angle, no anchoring means is needed, while if the inclined, lined, surface is on a relatively steep surface, a plurality of the aforementioned anchoring means may be used or other means of attachment may be provided.

It is to be noted that in this illustration, the modules 30 have been shown without the interlocking, interconnecting, lugs 40. While in most embodiments of my invention it is anticipated that the lugs 10 will be provided, it is well within the scope of the present invention that, where needed, the lugs 40 may be omitted, and all four sides of the module 30 may be defined by the horizontal grid bars 31, and the vertical grid bars 32, with the modules 30 connected by one or more of the rigid, interlocking connecting means 54, the right angled interlocking connecting means 81, or the hinged interlocking connecting means 95.

Thus, by greatly expanding on my previous invention, I have provided an entire system for lining surfaces of all types, whether they are horizontal, vertical, or inclined, and whether they are smooth, rough, or discontinuous. In addition, I have provided a means for anchoring the surface liner to the surface being lined when necessary, and I have provided a plurality of accessories for affixing or restraining various devices to the surface liner for the convenience of the user, such as means to stop tool boxes and the like from lateral movement on the lined surface, and structural members for retaining loads at certain spots, as well as providing bed liners for cargo areas, such as pickup truck bed and tail gate liners, to protect the tail gates of pickup trucks from damage.

I claim:
1. In combination, in a pick-up truck,
   a) a pick-up truck bed having a horizontal surface and a plurality of vertical walls at the extremities of said surface,
   b) a plurality of grid-like modules of a desired shape for interlocking with adjacent similarly or dissimilarly shaped grid-like modules, said modules having:
      i) a body portion with apertures extending through the thickness thereof,
      ii) equal length feet extending from the bottom of said body to support it in a spaced relationship from said horizontal and vertical surfaces, and
      iii) laterally projecting interlocking lugs for locking together said similarly and dissimilarly shaped modules,
   c) anchoring means for positively anchoring those modules lining said vertical surfaces to said vertical surfaces, said anchoring means including:
      i) a base mounted to said vertical walls,
      ii) a connector receiving portion removably attached to said base by connecting means, said connector receiving portion including an upstanding post portion with a connector receiver therein,
      iii) a cup washer mounted in at least one of said apertures and having an opening therethrough for a connector to pass through and
      iv) a connector passing through said cup washer and being received in said upstanding connector receiver of said post portion of said connector receiving portion, thereby firmly fastening said modules to said vertical walls.
2. The combination defined in claim 1, and including:
   a) at least one interlocking connecting means to provide additional connections between said modules where desired.
3. The combination defined in claim 1, and including at least one right hand ramp portion.
4. The combination defined in claim 1, and including at least one left-hand ramp portion.
5. The combination defined in claim 1, and including at least one border portion.
6. The combination defined in claim 1, wherein the top surface of at least some of said modules is substantially covered with pyramidal projections.
7. The combination defined in claim 1, wherein at least some of said apertures have crossbars therein.
8. The combination defined in claim 1, and including load stopping means.
9. The combination defined in claim 8, wherein said load stopping means include:
   a) a stop member, said stop member having a lower surface of a shape to fit into said aperture, and a flat top surface attachable to a load to be stopped.
10. The combination defined in claim 8, wherein said load stopping means include:
    a) a structural member and
    b) aperture engaging means attached to said structural member.

11. The combination defined in claim 10, wherein:
a) said structural member is provided with at least one axially extending groove, and
b) said aperture engaging means are slidably fitted in said groove.

12. The combination defined in claim 11, wherein said aperture engaging means are hook-like in nature and engage said aperture.

13. The combination defined in claim 12, wherein said structural member includes:
a) a body portion having said axially extending grooves formed therein, and
b) an upstanding wall portion.

14. The combination defined in claim 13, wherein said upstanding wall portion has a handhold formed therein.

15. The combination defined in claim 13, wherein said upstanding wall portion has at least one hole therein.

16. In combination, in a pickup truck;
(a) a pickup truck bed having a horizontal surface and a plurality of vertical walls at the extremities of said surface, and
(b) a plurality of gridlike modules of a desired shape for interlocking with adjacent similarly or dissimilarly shaped gridlike modules, said modules having:
  (1) a body portion with apertures extending through the thickness thereof,
  (2) equal-length feet extending from the bottom of said body to support it in a spaced relationship from said horizontal and vertical surface, and
  (3) laterally projecting interlocking lugs for locking together said similarly and dissimilarly shaped modules,
(c) a plurality of physically separate right angled interlocking connecting means providing connections between said gridlike modules along their meeting edges at the junction between said horizontal and said vertical surfaces,
(d) anchoring means for positively anchoring those modules lining said vertical surfaces to said vertical surfaces, wherein said anchoring means include:
  (1) a base mounted to at least some of said vertical surfaces,
  (2) a connector receiving portion removably attached to said base by connecting means,
  (3) a cup washer mounted in at least one of said apertures and having an opening therethrough for a connector to pass through, and
  (4) a connector passing through said cup washer and being received in said connector receiving portion, thereby firmly fastening said modules to said vertical walls.

17. The combination defined in claim 16, wherein at least some of said modules are of a different color than the other of said modules to provide a predetermined desired pattern in said horizontal and/or vertical surfaces.

18. A tailgate liner for a pick-up truck including:
a) a plurality of grid-like modules of a desired shape for interlocking with adjacent similarly or dissimilarly shaped grid-like modules, said modules having body portions, with apertures extending through the thickness of the body portion, feet extending from the bottom of the body portion to support it in a spaced relationship from said surface, and laterally projecting interlocking lugs for connecting said grid-like modules and
b) anchoring means for positively anchoring said grid-like modules to said tailgate, wherein said anchoring means include:
  i) a base mounted to said tailgate,
  ii) a connector receiving portion removably attached to said base by connecting means, said connector receiving portion including an upstanding post portion with a connector receiver therein,
  iii) a cup washer mounted in at least one of said apertures and having an opening therein for a connector to pass through, and;
  iv) a connector passing through said cup washer and being received in said connector receiving portion of said anchoring means, thereby fastening said grid-like modules to said tailgate.

19. A tailgate liner for a pick-up truck including:
a) a plurality of grid-like modules of a desired shape for interlocking with adjacent similarly or dissimilarly shaped grid-like modules, said modules having body portions with apertures extending through the thickness of the body portion, feet extending from the bottom of said body portion to support it in a spaced relationship from said surface, and laterally projecting interlocking lugs for connecting said grid-like modules, and
b) anchoring means for positively anchoring said grid-like modules to said tailgate, said anchoring means including:
  i) a base mounted to said tailgate,
  ii) a connector receiving portion removably attached to said base by connecting means, said connector receiving portion including an upstanding post portion with a connector receiver therein,
c) a cup washer mounted in at least one of said apertures and having an opening therein for a connector to pass through, and
d) a connector passing through said cup washer and being received in said connector receiver of said upstanding post portion, thereby fastening said grid-like modules to said tailgate.

20. An apparatus for lining the bed of a pickup truck, said apparatus including, in combination:
(a) a plurality of gridlike modules of a desired shape for interlocking with adjacent similarly or dissimilarly shaped rigid gridlike modules, said modules having:
  (i) a body portion with apertures extending through the thickness thereof,
  (ii) equal-length feet extending from the bottom of said body portion to support it in a spaced relationship from said pickup truck bed, and
  (iii) laterally projecting interlocking lugs for locking together said similarly and dissimilarly shaped modules,
(b) anchoring means for positively anchoring any modules lining a vertical surface of said pickup truck bed to said vertical surface, said anchoring means including:
  (i) a base mounted to said vertical walls,
  (ii) a connector receiving portion removably attached to said base by connecting means, said connector receiving portion including an upstanding post portion with a connector receiver therein,
  (iii) a cup washer mounted in at least one of said apertures and having an opening therethrough for a connector to pass through, and
  (iv) a connector passing through said cup washer and being received in said connector receiver of said post portion of said connector receiving portion, thereby firmly fastening said modules to said vertical walls when desired.

* * * * *